Patented July 15, 1947

2,424,152

UNITED STATES PATENT OFFICE 2,424,152

TITANIA GEL-BORIA CATALYST AND ITS METHOD OF PREPARATION

Gerald C. Connolly, Baton Rouge, La., assignor to Standard Oil Development Company, a corporation of Delaware No Drawing. Original application January 9, 1942, Serial No. 426,120, now Patent No. 2,339,838, dated January 25, 1944. Divided and this application August 22, 1942, Serial No. 455,729

3 Claims. (Cl. 252—225)

This application is a division of my copending application Serial No. 426,120, filed January 9, 1942, now U. S. Patent No. 2,339,838, dated January 25, 1944.

The present invention relates to improved catalysts, particularly suitable for the catalytic treatment of hydrocarbon oils, and to methods for preparing the said catalysts. As is generally known, catalysts such as acid treated clays of the montmorillonite type have been previously employed in the cracking of hydrocarbon oils, such as gas oil, to produce fractions boiling substantially within the gasoline range. These catalysts, as a rule, have given eminent satisfaction and when properly employed a good yield of high octane number gasoline may be obtained by cracking a suitable gas oil in vapor phase in the presence of such catalysts. As is generally known, however, the cracking of hydrocarbon oils in the presence of catalysts results in the deposition of carbonaceous materials upon the catalyst and in a stationary bed type of operation, that is to say, an operation in which the oil undergoing cracking is forced through a stationary bed of such catalyst, there comes a time when the operation must be discontinued to revivify and regenerate the catalyst. The most practical method for accomplishing the regeneration of the catalyst is to treat the catalyst with air or other free oxygen-containing gas at active combustion temperatures, say a temperature of about 700° F. to 1000° F. or thereabouts, whereupon the carbonaceous deposits are consumed by combustion and catalyst is thereby restored substantially to its original activity.

There are, however, certain limitations imposed on a process employing an acid treated clay, these limitations being with respect to the temperatures to which the catalyst may be exposed. For instance, ordinarily an acid treated clay may not be exposed to temperature conditions exceeding 1050° F. or 1100° F. without causing baking, fusion, or otherwise impairing the structure of the catalyst and thereby lowering its efficiency. This fact embodies certain precautionary measures which must be employed particularly during the regeneration of such a catalyst. For instance, ordinarily instead of using air during the regeneration, it is quite common to dilute the air with a more or less inert gas, such as flue gas, in order to prevent its rapid consumption of the carbonaceous deposits on the catalyst and with it temperature rises above the aforementioned limits, namely, 1100° F. so as to protect the catalyst during its regeneration. Obviously, it would be desirable to regenerate a catalyst as rapidly as possible in a stationary bed type of operation in order to operate the process so that the catalyst is in the onstream operation for a greater total time during a given period; but, as previously stated, it is not possible to employ air ordinarily, because the high content of oxygen releases more heat than can be withdrawn from the system rapidly, even though cumbersome and expensive cooling means are disposed within the mass of catalyst.

I have now discovered a new cracking catalyst which is very stable toward high degrees of heat. Essentially, this catalyst consists of a boron oxide supported on a titanium oxide gel. My tests have shown that this catalyst may be subjected to temperatures as high as 1840° F. without seriously affecting the activity of the catalyst. Thus it is evident that this catalyst may be regenerated at much higher temperatures than have previously been considered suitable for the reactivation of cracking catalysts. Therefore it is possible to regenerate using air or even an oxygen-enriched air without impairing the structure or the activity of the catalyst. As mentioned hereinbefore, by regenerating at a high temperature the time required for regeneration is considerably shortened and as a result the catalyst may be used for the desired reaction for a larger proportion of the cycle.

I shall now set forth several methods of preparing my improved catalyst in the form of the succeeding specific examples. It will be understood that the precise details hereinafter enumerated are purely illustrative and do not impose any limitation on the scope of my invention, for it will be obvious to those skilled in the art that reasonable modifications of the disclosed processes may be made without departing from the spirit of my invention.

The dry titania gel may be impregnated with a solution of boric acid. It is preferred to use just the right amount of solution to moisten the catalyst without leaving any residual liquid. The concentration of boric acid in the solution is adjusted to give the desired proportion of boria in the finished catalyst. Because of the limited solubility of boric acid in water, it is usually preferred to use a hot solution to increase the solubility so that a sufficient amount may be introduced into the catalyst. However, where it is desired to produce a catalyst with a high proportion of boria, it may be necessary to use a series of impregnation operations and to dry the catalyst between each impregnation. In this manner any desired amount of boria may be introduced into the catalyst. The impregnated material is dried at a temperature of 200–300° F. and is then activated by heating for several hours at a temperature from about 600 to about 1000° F. If the catalyst is to be used in other than powder or granular form, it may be extruded, pilled or otherwise shaped prior to the drying operation. In place of impregnating the dry gel with the boric acid solution, in some instances it may be desirable to impregnate the titania jelly with said solution or to mix the moist jelly with dry boric acid. Also other compounds of boron besides boric acid which can be readily converted to boric oxide may be used to impregnate the titania gel. In general, these catalysts may be prepared by impregnating, mixing or otherwise incorporating boria or any compounds readily converted to boria with titania gel in any suitable stage of its formation.

As a more specific illustration of the operation of the invention the following examples are given:

Example 1

Equal volumes of 1.2 normal ammonium hydroxide and 1.0 normal titanyl sulfate solutions are mixed with vigorous stirring to form a highly voluminous jelly of titania. The supernatant liquid has an excess alkalinity of about 0.01 to 0.10 normal. The jelly is allowed to stand over night after which it is washed by decantation until incipient peptization sets in. In the case of jellies formed in alkaline solution, one or two washings are usually all that can be tolerated before peptization begins. At this point the jelly is dried, preferably at a temperature above the boiling point of water. To avoid decrepitation, if the gel is desired in granular form, it is then further heated at a temperature of about 800° F. The dried gel is then further washed with water until substantially free of reaction products. This material when activated for three hours at 1000° F. with a particle size of 4–12 mesh will have an apparent density of between 1.00 and 0.80 gram per cubic centimeter.

Example 2

The same solutions used in Example 1 are mixed in such proportions that the supernatant liquid is acid, usually 0.001 to about 0.1 normal. The jelly is washed by decantation and it will be found in this case that it does not peptize so rapidly as the jelly formed in alkaline solutions. Usually five or more washings can be tolerated before peptization begins. The jelly is then dried, heated and rewashed as before. In this case the product will have an apparent density of about 1.0 to 1.3 grams per cubic centimeter.

Example 3

A dry titania gel with a particle size of 4–12 mesh and having an apparent density of 0.96 gram per cubic centimeter was mixed with sufficient boric acid solution to moisten the gel and to incorporate therein 5% of boric oxide. The moist mass was pilled and activated at a temperature of 800° F. for 3 hours or more. These pills were then used for cracking an East Texas gas oil of 33.8° A. P. I. gravity for a two hour period at a feed rate of 0.6 volume of gas oil per volume of catalyst per hour and a temperature of 850° F. During this period the yield of gasoline produced from the gas oil was 26.5% by volume.

Example 4

Some of the same titania gel used in Example 3 was impregnated with sufficient boric acid solution to incorporate therein 10% of boric oxide and was activated in the same manner. When tested for a two hour period under the same conditions used in Example 3, the yield of gasoline was 31.5%. This catalyst after operating for a two hour period was regenerated by burning with air. During the regeneration process the temperature of the catalyst reached a maximum of 1840° F. On a subsequent two hour cracking period under the same conditions, this batch of catalyst converted 34% of the gas oil to gasoline.

Example 5

A part of the same batch of titania gel used in the previous examples was impregnated with sufficient boric acid solution to incorporate therein about 15% of boria. This catalyst when activated and tested under the same conditions described above, gave an 18.0% yield of gasoline.

Example 6

Another portion of the same titania gel was impregnated with sufficient boric acid solution to incorporate therein about 20% of boria. When it was activated and tested according to the conditions outlined above, a yield of 14.0% gasoline was obtained.

As to other reactions for which this catalyst is suitable, there may be mentioned dehydrogenation and reforming with or without the addition or recycling of hydrogen.

It will be understood that while my catalysts are particularly suitable for use in cracking hydrocarbon oils, they may be used for other purposes.

Many modifications of my invention will suggest themselves to those who are familiar with this art, and it is my intention to claim not only the express subject matter hereinbefore disclosed but also all reasonable modifications thereof except that excluded by the terms of the appended claims.

What I claim is:

1. A new catalyst consisting essentially of a titania gel having an apparent density of about 0.8 to 1.3 grams per cu. cm. when in 4–12 mesh granules and impregnated with boria, in which the weight per cent of boria with respect to the titania is from 5–20%.

2. The composition set forth in claim 1 in which the weight per cent of boria is about 10%.

3. In the method of preparing catalysts containing titania, the improvement which comprises mixing a titanyl sulfate solution with ammonium hydroxide solution to form a voluminous jelly of titania, the relative proportions of titanyl sulfate and ammonium hydroxide solutions being such as to impart to the supernatant liquid an excess alkalinity of about 0.01 to 0.10 normal, washing the jelly until incipient peptization begins, drying the washed jelly, heating the dried jelly to obtain a gel having an apparent density of between 1.00 and 0.8 gram per cu. cm., further washing the dried jelly to remove reaction impurities, impregnating the gel with sufficient boric acid solution to incorporate therein 5–20% of boric oxide, and activating the gel at a temperature of about 800° F.

GERALD C. CONNOLLY.

REFERENCES CITED

The following references are of record in the file of this patent:

UNITED STATES PATENTS

| Number | Name | Date |
|---|---|---|
| 1,996,009 | Krauch et al. | Mar. 26, 1935 |
| 2,278,228 | Watson | Mar. 21, 1942 |
| 2,232,727 | Peterkin | Feb. 25, 1941 |
| 2,339,249 | Danforth | Jan. 18, 1944 |
| 1,935,177 | Connolly et al. | Nov. 14, 1933 |
| 1,985,343 | Connolly et al. | Dec. 25, 1934 |
| 1,868,565 | Connolly et al. | July 26, 1932 |
| 1,900,859 | Connolly et al. | Mar. 7, 1933 |
| 1,822,848 | Barclay | Sept. 8, 1931 |
| 1,935,177 | Connolly et al. | Nov. 14, 1933 |
| 2,213,345 | Marschner | Sept. 3, 1940 |

FOREIGN PATENTS

| Number | Country | Date |
|---|---|---|
| 504,614 | Great Britain | Apr. 24, 1939 |
| 501,736 | Great Britain | Feb. 27, 1939 |
| 349,444 | Great Britain | May 26, 1931 |

OTHER REFERENCES

Berkman et al., "Catalysis," Reinhold Publishing Corp., N. Y. 1940, page 281.